May 29, 1934. V. FINA 1,960,970
VALVE MECHANISM
Filed Nov. 5, 1932
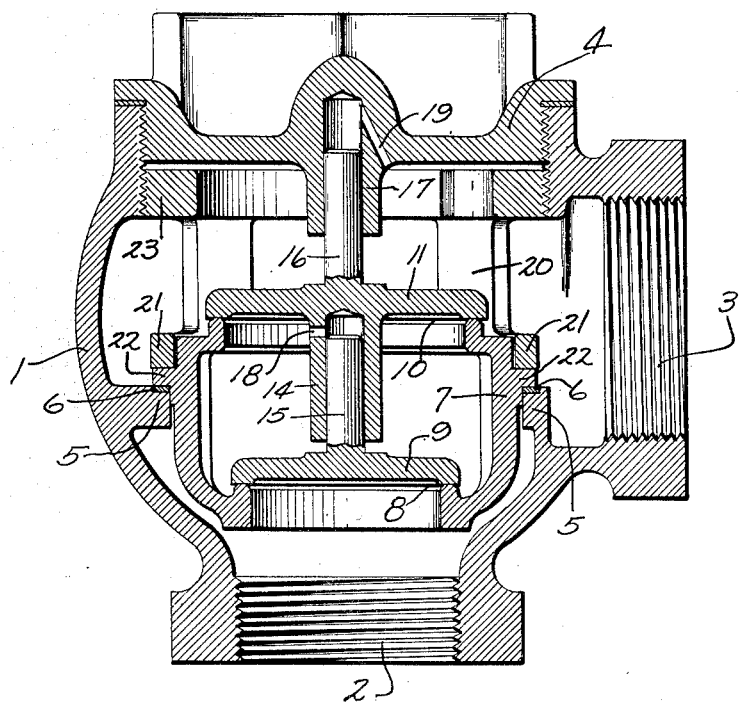
Inventor
Valentine Fina
By Wheeler, Wheeler and Wheeler
Attorneys Patented May 29, 1934

1,960,970

UNITED STATES PATENT OFFICE 1,960,970

VALVE MECHANISM

Valentine Fina, Milwaukee, Wis., assignor to Milwaukee Valve Company, Milwaukee, Wis., a corporation of Wisconsin Application November 5, 1932, Serial No. 641,341

3 Claims. (Cl. 277—42)

This invention relates to improvements in valve mechanisms and, more particularly, to a double check valve structure.

It is the primary object of the invention to provide an organization in which a valve seat member providing for the accurate seating of dual check valves is so positioned within the valve casing as to render all of the parts accessible and replaceable without imposing undue strain or distortion either upon the valve seat member or the valves themselves.

In the disclosed structure one of the valves is guided with reference to the valve casing closure and the other valve is guided from the first. Thus it is essential that the seats for the valves should be very accurately located with reference to each other and with reference to the casing and its closure. Any distortion of the valve seat member occasioned by the manner of fastening that member within the casing may result in unseating one of the valves or causing it to bind in the course of its movement. The present invention seeks to avoid such distortion without impeding flow through the valves.

The drawing shows a valve structure in axial section.

The casing 1 has the usual inlet and outlet ports 2 and 3. It is provided at 4 with a large removable closure which is screwed into the casing in axial alignment with port 2.

Spaced from port 2 within the casing is an annular bracket 5, preferably recessed to receive the packing 6. Closely fitted within the bracket 5 is a removable valve seat member 7 flanged to rest on packing 6 and of such dimensions as to be removable bodily from the casing through the opening into which closure 4 is normally screwed. The valve seat member 7 provides one seat at 8 for valve 9 and a second seat at 10 for valve 11. The stem 15 of valve 9 is guided within a socket 14 carried by valve 11. The stem 16 of valve 11 is guided within a socket 17 carried by the closure 4. Each of the sockets is suitably relieved by ducts 18 and 19 respectively.

The fact that the tubular valve seat member 7 extends through the bracket 5 and is provided with check valve seats at its opposite ends, makes a very compact organization in which one of the valve seats is located at one side of the bracket and the other is located at the other side of the bracket and immediately adjacent the inlet port.

If the valve seat member 7 is made of brass or bronze, or other relatively soft metals in accordance with conventional valve practice, there will be a tendency for it to be warped if it is screwed into the casing under sufficient pressure to make it reliably tight. If the casing member 7 is warped one or both of the valves 9 or 11 will almost certainly be unseated. In order to avoid any such possibility the present invention contemplates the use of a cage 20 cut away to permit free flow of fluid about the valve 11 and provided at its lower end with a ring 21 bearing about the complete periphery of the flange 22 which seats on packing 6. At its upper end the cage 20 has a second ring 23 threaded to mesh with the same casing threads in which closure 4 is engaged. Thus the cage 20 may be screwed down tight on to flange 22 in order positively to fix the position of the bearing member 7 without subjecting the bearing member to any appreciable torsional strains such as might warp its valve seat portions.

Upon removal of closure 4 the two valves 11 and 9 may be successively removed through cage 20 without disturbing the position of the cage or the bearing member 7. If the cage 20 is unscrewed, the bearing member 7 may also be removed from the valve casing. Thus I provide a structure in which the ready accessibility of all the parts is facilitated by the means employed for holding the bearing member in place without subjecting that member to distorsional strains.

I claim:

1. A valve structure comprising in combination a casing having inlet and outlet ports and an annular bracket between said ports, a member seated on said bracket and provided with spaced valve seats, one of which is below and the other above said bracket, valve means separately complementary to said seats, and means independent of said member disposed within said casing and releasably holding said member to said bracket.

2. A valve structure including the combination with a valve casing having inlet and outlet ports and an intermediate annular bracket, of a valve seat member having a shoulder portion seated upon said bracket and provided above and below said bracket with valve seats in series arrangement, valves coacting with the respective seats, and a cage adjustably connected with said casing and bearing upon said member in a direction to clamp said member upon said bracket.

3. In a valve organization the combination with a valve casing having an inlet and an outlet and an annular bracket in an intermediate portion, of a tubular valve seat member having a radial flange abutting said bracket to receive support therefrom, said member having check valve seats at each side of said bracket, valves coacting with the respective seats, and a cage including axially spaced rings one of which is threaded to said casing and the other of which is engaged with said flange in a direction to exert clamping pressure holding said member to said bracket.

VALENTINE FINA.